BIT LOADING DEVICE

Original Filed Dec. 27, 1960

Jackson M. Kellner *INVENTOR.*

BY John D. Gassett

ATTORNEY

United States Patent Office

Re. 26,120
Reissued Dec. 6, 1966

26,120
BIT LOADING DEVICE

Jackson M. Kellner, Harris County, Tex., assignor to Jersey Production Research Company, a corporation of Delaware Original No. 3,088,532, dated May 7, 1963, Ser. No. 78,618, Dec. 27, 1960. Application for reissue Feb. 3, 1966, Ser. No. 525,278
6 Claims. (Cl. 175—230)

Matter enclosed in heavy brackets [ ] appears in the original patent but forms no part of this reissue specification; matter printed in italics indicates the additions made by reissue.

This invention relates to an apparatus for applying weight to a bit used in drilling boreholes in the earth. More particularly it relates to a bottom hole assembly using hydraulic drilling pressure to exert force on a bit during the drilling of well bores.

In the art of drilling wells for the production of oil and gas, and the most commonly used method is the so-called rotary drilling method. In the rotary drilling method, the drill bit is suspended at the lower end of a string of drill pipe which is supported from the surface of the earth. A drilling fluid is forced down through the drill string through the drill bit and back up to the surface in the annulus between the drill pipe and the walls of the borehole. The purpose of the drilling fluid includes cooling the bit, carrying cuttings out of the well and also [to impose] *the imposing of* hydrostatic pressure upon high pressure formations penetrated by the drill bit to prevent the uncontrolled escape of oil, gas or water during drilling operation. [Rotary drilling practice has found] *Experience has shown that* the rate of penetration of a drilling bit [thorugh] *through* subterranean formation is increased by increasing the force on the drill bit against the bottom of the borehole. It has been further found that a more nearly straight hole is drilled by creating a localized force in the area immediately adjacent the drill bit. In the latter instance, the twisting and rotative movement of a lengthy string of relatively flexible drill pipe is straightened immediately adjacent the drill bit by the application of such force.

The usual method [that has been tried] for increasing the pressure of a bit on the [borehole] *formation* is by the addition of several heavy drill collars between the drill bit and the drill string. [Modern drilling practice has indicated that a trend toward even] *It has been shown that* higher bit weight results in maximum drilling rates and accordingly minimum footage cost. The use of heavy drill collars has not been completely satisfactory. While the addition of drill collars has aided the penetration rate, this advantage is offset by the need for heavier surface equipment. Also, more horsepower and rig time are required in pulling the drill pipe, drill collar and drill bit during normal operations of drilling such as are required when the drill bit becomes worn and needs replacing.

[Briefly in] *In* a preferred embodiment, this invention comprises means for forcing a bit against the bottom of a borehole. It includes an inner telescoping shaft attachable at its lower end to a bit and at its upper end to a drill string. An outer case or housing surrounds the telescoping shaft in a slidable and rotatable relationship. Thrust or pushdown means are positioned between the shaft and the outer case and are of a character to forcibly move the shaft longitudinally in the direction of a bit with respect to the case. Anchor means are positioned in the outer case spaced preferably below the pushdown means and are of a character to firmly grip the borehole wall so as to transfer the reaction thrust of the force exerted on the bit to the borehole wall.

The telescoping transmission shaft is divided into an upper section and a lower section. These two sections rotate together but have limited longitudinal movement with respect to each other. In other words, when the upper section is moved the limit of its longitudinal stroke in one direction, downward longitudinal force applied on the upper section is transmitted to the lower section. When the telescoping joint is in the other limit of its stroke, an upward pull on the upward section of the telescoping shaft is transmitted to the lower section. On the upper section of the telescopic shaft just above the outer case is a resetting shoulder which is of a character to engage the upper shoulder of the housing. The [function of the] telescopic joint and the resetting shoulder, as will be explained more fully hereinafter, are used to aid in controlling the force on the bit applied by the pushdown section and to reset the outer housing.

Various objects and a better understanding of this invention will be obtained from the following description *and the accompanying drawing, in* which:

Figure 1B:
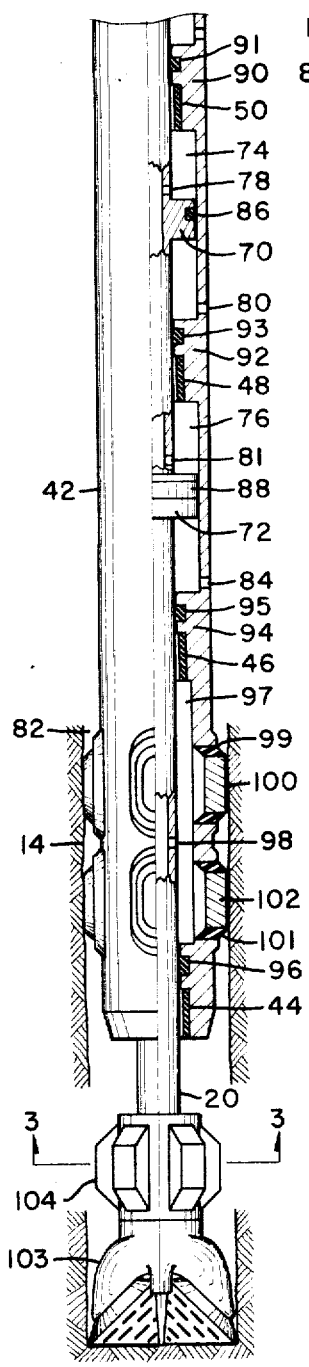
FIGS. 1A and 1B are views which together illustrate the details of the preferred embodiment of this invention with FIG. 1A illustrating the upper portion and FIG. 1B illustrating the lower portion.
Figure 1A:
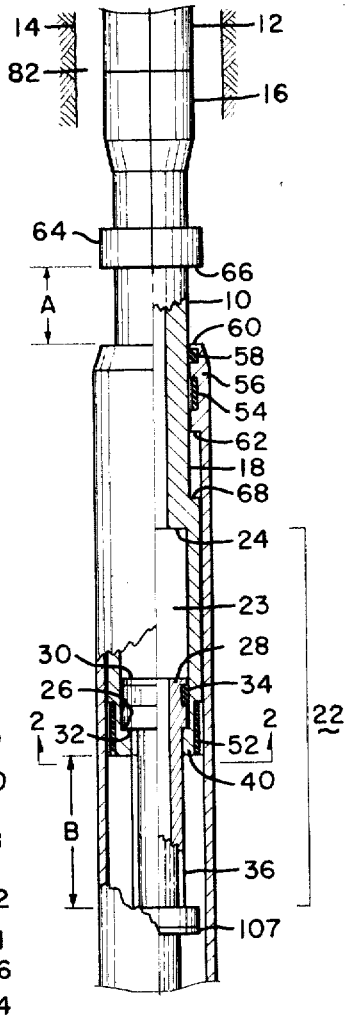
Figure 2:
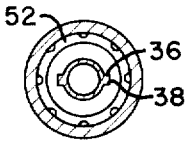
FIG. 2 is a sectional view taken along the line of 2—2 of FIG. 1A.

In the drawing, a power transmission shaft 10 is shown supported from a conventional tubular drill pipe 12 which is suspended from the surface in borehole 14 through drill tool joint 16. The telescoping power transmission shaft is divided into an upper portion 18 and a lower portion 20 which are connected by a telescoping joint 22. The lower end of the upper section 18 is enlarged to form an annular recess 23 which has a downwardly facing shoulder 24 and an upper facing shoulder in shoulder member 40. The upper end of lower joint 20 is enlarged to have a shoulder member 28 fit within annular recess section 23. Shoulder member 28 has an upwardly facing shoulder 30 which when shoulder member 28 is in its uppermost position in recess 23 contacts downward shoulder 24. When shoulder member 28 is in its lowermost position, as illustrated in FIG. 1A, its downward facing shoulder 32 contacts upwardly facing shoulder 26 of recess 23. A seal 34 is provided between external part of shoulder member 28 and the internal surface of annular recess 23. As is seen more clearly in the section shown in FIG. 2, splines 36 on lower shaft section 20 fit or interlock within a matching recess 38 of the lower shoulder member 40 of upper shaft section 18.

Mounted about telescoping shaft 10 is a case or housing 42. The lower part of housing 42 surrounds and is supported from lower joint 20 by bearings 44 at the lower end of the housing and intermediate bearings 46, 48 and 50. A seal 96 is provided between housing 42 and shaft 20 just above bearings 44. Housing 42 surrounds and is supported from upper shaft section 18 by lower bearing 52 and upper bearing 54. The upper end of housing 42 has a shoulder member 56 which supports bearing 54 and wiper 58. Shoulder member 56 has an upwardly facing shoulder 60 and a downwardly facing shoulder 62. A resetting shoulder 64 having a downwardly facing face 66 is provided on upper shaft section 18 above housing 42. The downwardly facing shoulder 66 is arranged to contact upwardly facing shoulder 60 of housing 42 when the shaft moves downwardly with respect to the housing. Upper shaft section 18 just above annular recess 23 has an upwardly facing shoulder 68. When shaft 10 is raised with respect to the housing, shoulder 68 engages shoulder 62 of shoulder member 56 and is capable of supporting housing 42.

Attention will now be directed toward that part of the apparatus which may be called the hydraulic load developing section *and* which includes an upper piston 70 and a lower piston 72. These pistons may be an integral part of lower shaft section 20. [An annular recess] *Annular recesses* 74 and 76 are formed between shaft 20 and housing 42 to receive [piston] *pistons* 70 and 72 respectively. The upper portion of cylinder 74 above piston 70 is in fluid communication with the interior of hollow shaft 20 through port 78. The lower part of cylinder 74 is in communication with the exterior of housing 42 through port 80 in the wall of the housing. The upper part of cylinder 76 above piston 72 is in fluid communication with the interior of hollow shaft section 20 through port 81 in the wall of the hollow shaft section. The portion of cylinder 76 below piston 72 is in fluid communication with the annulus 82 exterior of the housing through port 84 in the wall of the housing. Pistons 70 and 72 are each provided with seals 86 and 88 respectively to help form a seal between the interior of housing 42 and the exterior annular [surface] *surfaces* of pistons 70 and 72.

The upper [limits] *limit* of cylinder 74 is determined by an annular shoulder member 90 which supports intermediate bearing 50 and seal 91. The lower portion of cylinder 74 is formed by another annular shoulder member 92 which has intermediate bearing 48 and seal 93 between the interior of shoulder member 92 and the exterior of shaft section 20. The lower portion of cylinder 76 is formed by annular shoulder member 94. Between shoulder 94 and lower shaft section 20 are bearings 46 and seal 95. Bearings 54, 52, 50, 48, 46 and 44 may be similar and are preferably made of fluted rubber. Seals 96, 95, 93, 91, 34 and 58 can all be similar and are preferably a lip or V-ring seal.

Below the bit load developing section is an anchor section. This includes a pressure chamber 97 formed between the outer part of lower shaft section 20 and the interior of housing 42. A port 98 in the wall of lower shaft section 20 [fluidly communicates] *provides fluid communication between* the interior of the hollow shaft [with] *and* pressure chamber 97. In the wall of lower housing 42 adjacent pressure chamber 97 [are] *is* a series of openings 99 in which a plurality of anchor shoes 100 have been mounted. Anchor shoes 100 preferably [includes] *include* a rubber molding 101 which is molded to or otherwise sealed with the walls of the openings 99. A hard metal core 102 is supported within the rubber material 101. These shoes are of a character such that when pressure is exerted in pressure chamber 97 the core 102 is forced outwardly against the borehole wall 14 but when the pressure is released, the core 102 is retracted by the rubber molding 101.

Figure 3:
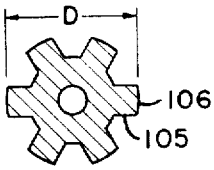
FIG. 3 is a sectional view taken along the line 3—3 of FIG. 1B.

Mounted at the lower end of lower shaft 20 is a bit means 103. Just above bit means 103 is a spiraling preventer 104 which can be made an integral part of lower shaft section 20. Spiraling preventer 104 includes a series of spaced-apart hard surfaced skates or shoes 105 spaced about the circumference of the shaft. The face 106 of each skate 105 is preferably hard surfaced. The diameter as shown in FIG. 3 is approximately equal *to* or slightly greater than the relaxed diameter of the anchor shoes and less than the [gaged] *gage* diameter of the bit. A spiraling preventer 104 stops or reduces spiraling (bit walking) and prevents substantial reduction of "drift" diameter of the hole. This permits [readily] *rapid* advancement of the outer case or housing 42 [after] *while* resetting of the tool. A hardened steel stop 107 is provided on lower shaft section 20. Stop or shoulder 107 is provided to prevent pistons 70 and 72 from striking the packing glands housing within shoulder members 90 and 94 respectively. This stop is especially useful in drilling [offi;] *off;* that is, when the bit has drilled nearly its full length of stroke of piston 70. Before pistons 70 and 72 strike the bottom of their respective cylinders 74 and 76, stop 107 comes in contact with annular shoulder 90 which is also hardened. This prevents damage to the pistons and their packing and shaft seals.

[Having described the] *The* structural components of the apparatus *having been described,* attention will now be directed toward the operation of the tool. In operation, the apparatus is assembled as shown in the drawing and is attached to drill pipe 12. The device is then lowered into the borehole until it reaches the bottom thereof. Drilling fluid under pressure is then directed downwardly through drill pipe 12 and [telescope section] *telescoping* shaft 10 [through] *to* drill bit 103. The drilling fluid passes through bit 103 and returns to the surface through annulus 82. There is a pressure drop through bit 103 so that the pressure within the hollow shaft 10 is much greater than that in annulus 82. The pressure drop through a rotary type bit 103 will vary; however, it is normally in the range of 500 or 600 pounds per square inch or more. This fluid carries the cuttings cut by bit 103 to the surface and also acts to cool the bit. The tool is [set] *reset* on the bottom of the hole before *circulation of* the drilling fluid is commenced [to be circulated]. The drilling fluid expands anchor shoes 100 against the borehole 14, securely anchoring housing 42 against longitudinal or rotational movement. Fluid also goes in through ports 78 and 81 to the upper side of pushdown or thrust pistons 70 and 72. The ports 78 and 81 can be designed with respect to port 98 such that anchor shoes 100 are firmly anchored before pistons 70 and 72 move substantially with respect to housing 42. Alternately, downward force can continue to be applied on drill string 12 until pressure is built up therein so that anchor shoes 100 can be set before there is any substantial movement of the housing upwardly. With this technique, very [small] *little* consideration will have to be given to the throttling effect or sizing of ports 78 and 81 with respect to port 98 in order to obtain the proper throttling effect. Other means to prevent this movement prior to the anchorage of the anchor section can be used. The drill string 12 is rotated, thus rotating bit 103 cutting the borehole deeper. The force on the bit 103 is supplied primarily by the downward thrust on pistons 70 and 72. The lower side of these pistons are in fluid communication with the relative lower pressure in the annulus 82.

As drilling continues, pistons 72 and 70 move downwardly toward the lower end of their stroke within their cylinders. Just before the pistons strike the lower end of their cylinders, stop 107 comes to rest on annular shoulder 90. The end of the [length of the] stroke can be determined at the surface, if desired, by pulling up on drill pipe 12 [such] *so* that upwardly facing shoulder [32] *26* of upper shaft section 18 is in contact with downwardly facing shoulder [26 of upper shaft section 18] *32 of lower shaft section 20.* Thus, when drill pipe 12 is moved downwardly a distance equal to the distance of the stroke of the power pistons 70 and 72, which are made to have the same stroke, it is known that pistons 70 and 72 are at the bottom of their stroke and the apparatus needs resetting. The drilling fluid within drill pipe 12 is cut off from its source so that the pressure will drop, thus allowing anchor shoes 100 to retract. The force is then applied downwardly to drill pipe 12 as to move resetting shoulder 64 downwardly against upwardly facing shoulder 60 of housing 42. This, then, pushes housing 42 downwardly until pistons 70 and 72 are in the uppermost part of their cylinders 74 and 76 respectively. During this operation, lower shaft section 20 remains stationary when bit 103 is on the bottom of the borehole; therefore, the upper shaft section 18 slides downwardly through telescoping joint 22. The "stroke" of telescoping joint 22 which is the distance between upper face 30 of shoulder member 28 of the lower shaft section and the downwardly facing shoulder 24 of the upper shaft section 18 is approximately equal to the stroke of pistons 70 and 72 to permit their being completely reset. There is no danger of pistons 70 and 72 being jammed against the upper portion of their cylinders inasmuch as stop 107 will prevent excessive relative upward movement of the lower shaft section 20. In other words, the distance B between stop 107 and the lower portion of upper shaft section 18 is approximately equal to the desired stroke of piston 70. Distance A with the apparatus in the position shown in FIG. 1A, which is the distance between upper shoulder 60 of the housing 42 and resetting shoulder 66, is approximately equal to the distance between stop 107 and the upper face of shoulder member 90. When the tool has been reset, fluid pressure is again applied into drill pipe 12 and the drilling operation continues as described before. It is thus seen that [by] holding drill pipe 12 in a slight tension [that] *maintains* shoulders 28 and 40 of the upper and lower shaft sections [are] in contact *with one another*. By this technique the distance which drill bit 103 drills during any stroke is readily determined from the surface by observing the lowering of the drill pipe. It is then known that the tool needs to be reset.

An important feature of telescoping joint 22 is that the lower shaft section 20 can be "picked up" and upward force applied thereto through upper shaft section 18 [through] *and* drill string 12 from the surface. This permits the force on bit 103 to be regulated from the surface in certain operations such as reaming where it is desired that less force be applied to the bit 103 than in other operations [for example]. By pulling back on drill string 12 during drilling [it is not necessary to reduce], *the necessity for reducing* the pressure of the fluid in the drill string [; this] *to regulate the force on the bit can be eliminated. This* permits optimum circulating fluid pressure and volume while yet maintaining the desired force on drill bit 103.

When it is desired to come out of the hole with the tool, pressure in the drilling fluid is shut off so that anchor shoes 100 are retracted. Then an upward force is applied to drill pipe 12 which causes upper shaft section 18 to move upwardly until shoulder 68 thereof contact shoulder 62 of the housing. Further upward movement of drill pipe 12 then also moves housing 42 upwardly. Shoulder member 28 of lower shaft section 20 contacts the lower shoulder [(upwardly facing shoulder 26)] *member* 40 of upper shaft section 18 *and* thus [carrying] *carries* the lower shaft section 18 and bit 103 with it. Drill pipe 12 is continually raised then until the tool has been removed from the borehole.

While the above disclosed embodiments of the apparatus have been shown in detail, it is possible to produce still other embodiments without departing from the inventive concept herein disclosed. It is therefore desired that only such limitations be imposed on the appending claims as are stated therein.

What is claimed is:

1. An apparatus for forcing a bit against the bottom of a borehole comprising:

an upper hollow shaft section;

a lower hollow shaft section;

a telescoping joint section connecting said upper shaft section and said lower shaft section in a longitudinally slidable and non-rotatable relationship, *said telescoping joint section including means for limiting* the longitudinal movement of said upper shaft *section* and said lower shaft *section* relative to [each other being limited in each direction longitudinally] *one another in both directions;* a housing member mounted around said upper shaft *section* and said lower shaft *section* in a longitudinally slidable rotable relationship therewith;

pushdown means positioned between said lower shaft section and said housing operable to exert a force on said lower shaft section longitudinally thereof in the direction of said bit and to exert the reaction thrust of such force on said housing member;

means to transfer the force on said lower shaft section to said bit;

anchor means attached to said outer housing and of a character to transfer the reaction thrust to the borehole wall.

2. In a rotary drilling apparatus for drilling a borehole which includes a drill string and a bit, the improvement which comprises:

a hollow telescoping shaft having an upper section and a lower section [and], *said shaft being* adapted to connected at its upper end [of its upper section] to drill string and at its lower end [of its lower section] to said bit, said shaft being further adapted to transmit fluid and torque from said drill string to said bit, *and said shaft including means limiting* the telescoping movement of each section of the shaft with respect to the other [being limited] in [each] *both* longitudinal [direction] *directions;* an upwardly facing shoulder on said upper section of the hollow shaft;

a case mounted around said shaft in a longitudinally slidable and rotatable relationship therewith, said case having a downwardly facing shoulder on its upper end adapted to engage the upwardly facing shoulder of said upper section;

wall anchor means mounted on said case and operable to anchor said case to the wall of the borehole;

pushdown means positioned between the lower section of said shaft and said case operable to exert a force on said shaft longitudinally thereof in the direction of said bit and to exert the reaction thrust of such force on said case;

and a resetting shoulder member on said upper shaft section having a downwardly facing face adapted to contact the upper end of said housing.

3. An apparatus as defined in claim 2 in which said lower section of said shaft just above said bit has a spiraling preventer.

4. In a rotary drilling system for drilling a borehole, including a drill string and a bit, the improvement which comprises:

a hollow telescoping shaft member connected at its upper end to said drill string and at its lower end to said bit and adapted to convey fluid therebetween, said telescoping shaft including an upper section, [and] a lower section which [have] *is* non-rotatable [relation] with respect to [each other,] *said upper section, and a telescoping joint interconnecting said upper section and said lower section, said telescoping joint including means for limiting the movement of said upper and lower sections with respect to one another in both longitudinal directions and* the exterior surface of said lower section defining a piston;

a case surrounding said telecsoping shaft in a rotatable and longitudinally slidable relationship therewith and defining a cylinder for said piston;

port means in said lower section of said shaft to provide fluid communication between the interior of said shaft and said cylinder above said piston;

second port means in said case to provide fluid communication between the cylinder below said piston and the exterior of said case;

wall anchor means mounted on said case and operable to anchor said case to the wall of the borehole;

[means to limit in each direction the longitudinal movement of said upper section and said lower section of the hollow shaft with respect to each other;]

and a resetting shoulder mounted about the upper end of said upper section of the shaft and adapted to contact said case on downward movement of said upper section with respect to said case.

5. An apparatus for forcing a bit against the bottom of a borehole comprising:

an inner telescoping shaft [comprising] *having* an upper section and a lower section [and whose],

*said upper and lower sections including members which engage one another and limit* longitudinal movement *of said sections* with respect to each other [is limited] in [each] *both* longitudinal [direction] *directions*, the lower end of said lower section of the shaft being attachable at its lower end to said bit;

an outer case surrounding said shaft in a longitudinally slidable and rotatable realtionship therewith;

pushdown means positioned between the lower section of said shaft and said case for exerting a force on said lower section of said shaft longitudinally thereof in the direction of said bit with respect to said case;

anchor means located in said outer case spaced longitudinally below said pushdown means and of a character to transfer reaction thrust of the force exerted on the bit to the borehole wall;

and a resetting shoulder mounted about said upper section of the shaft exterior of said case and arranged to contact the upper exterior end of said case upon relative movement between said upper section in said shaft and said housing.

6. An apparatus as defined in claim 5 in which an annular bearing stop member is mounted about said lower section of said shaft above said pushdown means.

References Cited by the Examiner

The following references, cited by the Examiner, are of record in the patented file of this patent or the original patent.

UNITED STATES PATENTS

| | | | |
|---|---|---|---|
| 556,718 | 3/1896 | Seemer | 175—118 |
| 2,589,534 | 3/1952 | Buttolph | 175—325 |
| 2,684,835 | 7/1954 | Moore | 175—321 |
| 2,728,556 | 12/1955 | House | 175—325 X |
| 2,743,781 | 5/1956 | Lane. | |
| 2,937,007 | 5/1960 | Whittle | 175—321 X |
| 2,942,667 | 6/1960 | Blood et al. | |
| 3,225,844 | 12/1965 | Roberts | 175—230 |

CHARLES E. O'CONNELL, *Primary Examiner.*

D. H. BROWN, *Assistant Examiner.*